(12) United States Patent
Foser

(10) Patent No.: US 9,776,590 B1
(45) Date of Patent: Oct. 3, 2017

(54) PERSONAL PROTECTION ASSEMBLY

(71) Applicant: Nathan Foser, Waynesville, OH (US)

(72) Inventor: Nathan Foser, Waynesville, OH (US)

( * ) Notice: Subject to any disclaimer, the term of this patent is extended or adjusted under 35 U.S.C. 154(b) by 0 days.

(21) Appl. No.: 15/175,728

(22) Filed: Jun. 7, 2016

(51) Int. Cl.
*B60R 21/055* (2006.01)
*B60R 21/04* (2006.01)

(52) U.S. Cl.
CPC ........ *B60R 21/055* (2013.01); *B60R 21/0428* (2013.01)

(58) Field of Classification Search
CPC ... B60R 21/055; B60R 21/0428; B60R 22/08; B60R 2/021
See application file for complete search history.

(56) References Cited

U.S. PATENT DOCUMENTS

| | | | | |
|---|---|---|---|---|
| 3,806,152 A * | 4/1974 | Witchger | ................ | B60R 21/02 280/751 |
| 4,223,914 A * | 9/1980 | Usami | ..................... | B60R 22/24 280/803 |
| 4,786,080 A * | 11/1988 | Jay | .......................... | B60R 22/14 280/808 |
| 4,795,190 A * | 1/1989 | Weightman | ............. | B60R 22/00 280/808 |
| 4,828,287 A * | 5/1989 | Siler | .................... | B60N 2/4879 280/751 |
| 4,838,575 A * | 6/1989 | Livingston | ........... | B60N 2/4879 280/748 |
| 5,161,824 A * | 11/1992 | Li | ........................... | B60R 22/14 280/801.1 |
| D337,231 S | 7/1993 | Levien | | |
| 5,382,078 A * | 1/1995 | Lanteri | ................ | A61G 5/1091 297/391 |
| 5,529,344 A * | 6/1996 | Yasui | .................... | B60R 21/055 280/808 |
| 5,685,566 A * | 11/1997 | Hirase | ..................... | B60R 22/24 280/801.1 |
| 5,746,449 A * | 5/1998 | Hiroshige | ............. | B60R 21/055 280/808 |
| 5,779,270 A * | 7/1998 | Tanaka | .................... | B60R 21/04 280/751 |
| 5,863,069 A * | 1/1999 | Wickenheiser | ......... | B60R 22/24 280/751 |
| 6,007,100 A * | 12/1999 | Steffens, Jr. | ............ | B60R 22/24 280/751 |
| 6,106,012 A * | 8/2000 | Boegge | ................. | B60R 21/055 280/801.1 |
| 6,692,071 B2 | 2/2004 | Fowler | | |

(Continued)

FOREIGN PATENT DOCUMENTS

WO WO03086126 10/2003

*Primary Examiner* — Paul N Dickson
*Assistant Examiner* — Timothy Wilhelm

(57) ABSTRACT

A personal protection assembly for protection in a side impact collision includes a first pad that is resilient. The first pad is substantially complementary to a seatbelt pulley and a portion of an adjacent column of a vehicle to which the seatbelt pulley is coupled. The first pad is configured to couple to the adjacent column to cover the seatbelt pulley. The first pad is positioned to couple to the adjacent column to cover the seatbelt pulley and is configured to provide impact protection, in the event of a side impact collision, to a head of a user positioned in a seat fitted with a seatbelt coupled to the seatbelt pulley.

15 Claims, 3 Drawing Sheets

(56) References Cited

U.S. PATENT DOCUMENTS

| | | | |
|---|---|---|---|
| 6,808,225 B2* | 10/2004 | Moriyama | B60J 5/043 296/146.6 |
| 6,874,818 B2* | 4/2005 | Crimmins | B60R 22/24 280/805 |
| 6,961,963 B2 | 11/2005 | Rosie | |
| 7,198,288 B2 | 4/2007 | Kim et al. | |
| 7,207,596 B2 | 4/2007 | Linder et al. | |
| 7,404,579 B2* | 7/2008 | Zierle | B60R 22/201 280/804 |
| 7,631,935 B2 | 12/2009 | Chen et al. | |
| 8,678,439 B2* | 3/2014 | Marziani | B60R 22/18 280/801.1 |
| 8,985,622 B1 | 3/2015 | Cannon | |
| 2004/0241388 A1* | 12/2004 | Ray, Jr. | B60R 21/055 428/122 |

\* cited by examiner

PERSONAL PROTECTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention
(2) Description of Related Art Including Information Disclosed Under 37 CFR 1.97 and 1.98.

The disclosure and prior art relates to personal protection assemblies and more particularly pertains to a new personal protection assembly for protection in a side impact collision.

BRIEF SUMMARY OF THE INVENTION

An embodiment of the disclosure meets the needs presented above by generally comprising a first pad that is resilient. The first pad is substantially complementary to a seatbelt pulley and a portion of an adjacent column of a vehicle to which the seatbelt pulley is coupled. The first pad is configured to couple to the adjacent column to cover the seatbelt pulley. The first pad is positioned to couple to the adjacent column to cover the seatbelt pulley and is configured to provide impact protection, in the event of a side impact collision, to a head of a user positioned in a seat fitted with a seatbelt coupled to the seatbelt pulley.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
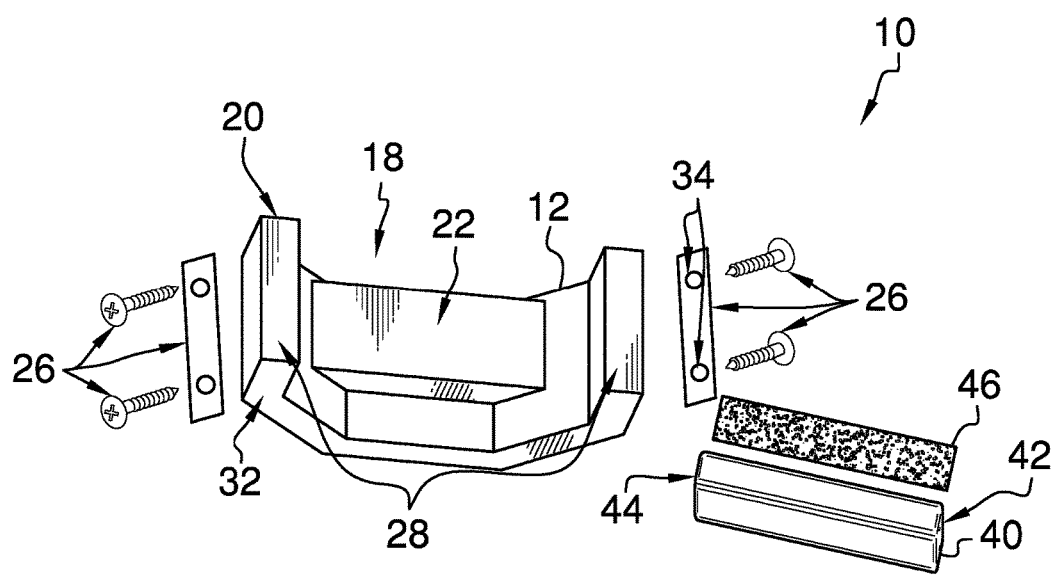
FIG. 1 is an isometric perspective view of a personal protection assembly according to an embodiment of the disclosure.
Figure 2:
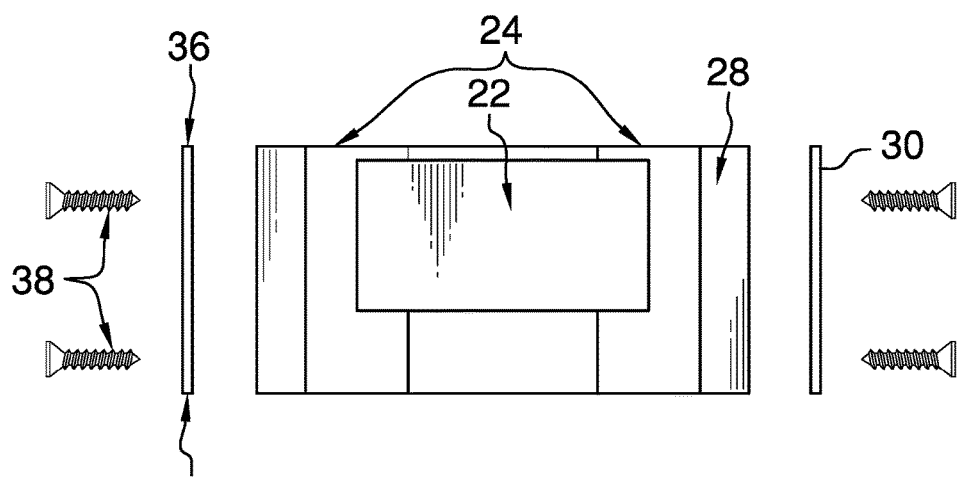
FIG. 2 is a back view of an embodiment of the disclosure.
Figure 3:
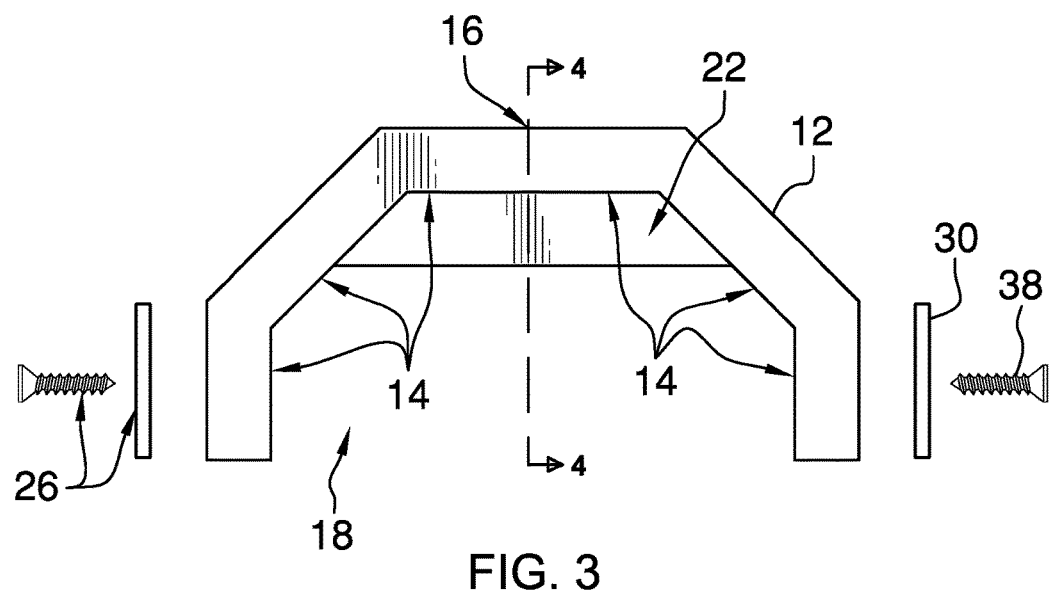
FIG. 3 is a top view of an embodiment of the disclosure.
Figure 4:
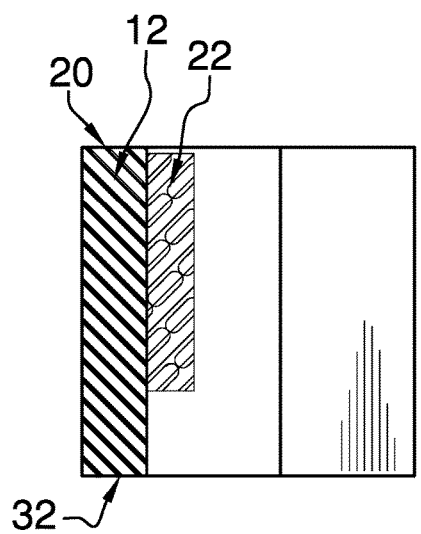
FIG. 4 is a cross-sectional view of an embodiment of the disclosure.
Figure 5:
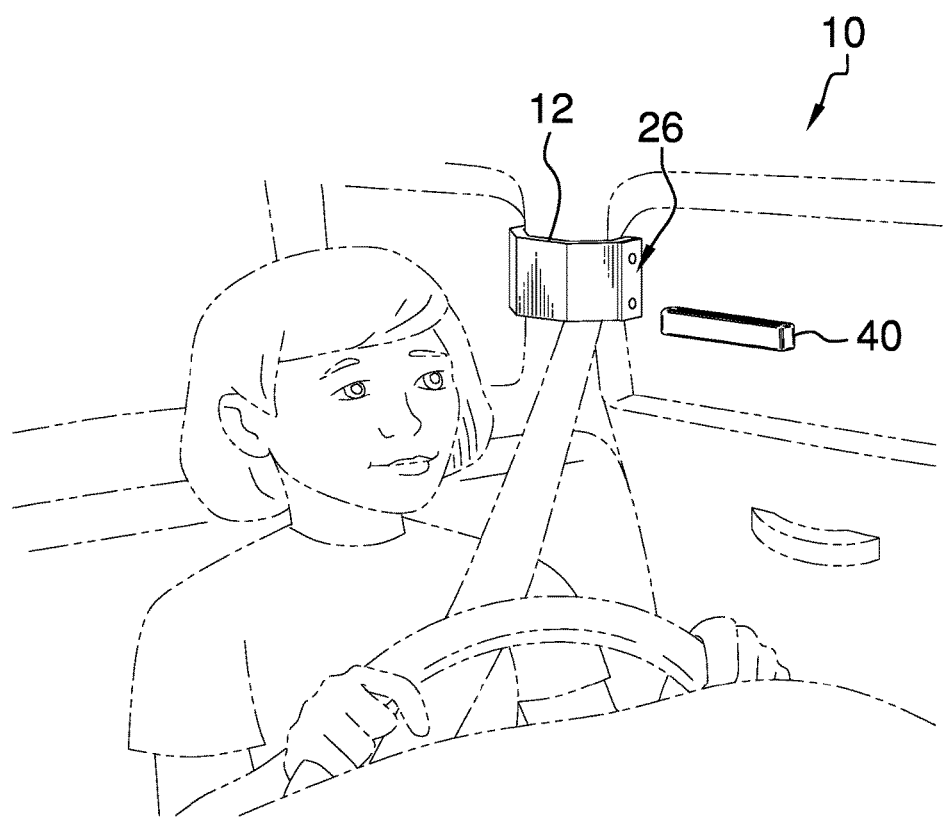
FIG. 5 is an in-use view of an embodiment of the disclosure.

With reference now to the drawings, and in particular to FIGS. 1 through 5 thereof, a new personal protection assembly embodying the principles and concepts of an embodiment of the disclosure and generally designated by the reference numeral 10 will be described.

As best illustrated in FIGS. 1 through 5, the personal protection assembly 10 generally comprises a first pad 12 that is resilient. The first pad 12 is substantially complementary to a seatbelt pulley and a portion of an adjacent column of a vehicle to which the seatbelt pulley is coupled. The first pad 12 is configured to couple to the adjacent column to cover the seatbelt pulley.

The first pad 12 has a pair of opposing sections 14 that extends divergently from a center 16 of the first pad 12, defining a recess 18. The recess 18 is substantially complementary to the seatbelt pulley and the portion of the adjacent column of the vehicle to which the seatbelt pulley is coupled. In one embodiment, the first pad 12 is substantially half-octagonally shaped when viewed from a top 20 of the first pad 12. In another embodiment, the first pad 12 comprises rubber. In yet another embodiment, the first pad 12 comprises foam. In still yet another embodiment, the first pad 12 comprises rubber foam.

An insert 22 is coupled to the first pad 12 within the recess 18. The insert 22 is resilient. The insert 22 is positioned in the recess 18 such that the insert 22 is configured to position between the first pad 12 and the seatbelt pulley. The insert 22 extends between a pair of angled sections 24 of the first pad 12. The insert 22 is positioned proximate to the top 20 of the first pad 12. In one embodiment, the insert 22 comprises foam. In another embodiment, the insert 22 comprises rubber foam.

Each of a pair of couplers 26 is configured to couple a respective opposing end 28 of the first pad 12 to the adjacent column. Each coupler 26 comprises a brace 30, which is substantially rectangularly shaped. The brace 30 is dimensioned to extend from proximate to the top 20 to proximate to a bottom 32 of the first pad 12 adjacent to the respective opposing end 28 of the first pad 12. The brace 30 comprises metal.

A plurality of holes 34 is positioned through the brace 30. In one embodiment, the plurality of holes 34 comprises holes 34 positioned singly proximate to each opposing endpoint 36 of the brace 30. Each coupler 26 also comprises a plurality of screws 38 that is equivalently numbered to the plurality of holes 34. The screws 38 are self-tapping. Each hole 34 is positioned in the brace 30 such that a respective screw 38 is positionable through the hole 34 and the first pad 12 proximate to a respective the opposing end 28, such that the first pad 12 is screwedly coupled to the adjacent column.

In another embodiment, the assembly 10 also comprises a second pad 40. The second pad 40 is resilient. The second pad 40 is configured to couple to a window adjacent to the seatbelt pulley. The second pad 40 is substantially rectangularly box shaped. In one embodiment, the second pad 40 comprises rubber. In another embodiment, the second pad 40 comprises foam. In yet another embodiment, the second pad 40 comprises rubber foam.

A first fastener 42 is coupled to a back face 44 of the second pad 40. A second fastener 46 is adhesively couplable to the window. The second fastener 46 is complementary to the first fastener 42. The second fastener 46 is configured to adhesively couple to the window such that the second fastener 46 is positioned to couple to the first fastener 42 to couple the second pad 40 to the window. In one embodiment, the first fastener 42 and the second fastener 46 comprises a nylon hook and loop fastener 48.

In use, the first pad 12 is positioned to couple to the adjacent column to cover the seatbelt pulley. The first pad 12 is configured to provide impact protection to a head of a user positioned in a seat fitted with a seatbelt coupled to the seatbelt pulley in the event of a side impact collision. The second pad 40 is configured to couple to the window adjacent to the seatbelt pulley. The second pad 40 also is configured to provide impact protection to the head of the user in the event of a side impact collision.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A personal protection assembly comprising:
    a first pad, said first pad being resilient, said first pad being substantially complementary to a seatbelt pulley and a portion of an adjacent column of a vehicle to which the seatbelt pulley is coupled, said first pad being configured for coupling to the adjacent column to cover the seatbelt pulley;
    wherein said first pad is positioned for coupling to the adjacent column to cover the seatbelt pulley, wherein said first pad is configured to provide impact protection to a head of a user positioned in a seat fitted with a seatbelt coupled to the seatbelt pulley in the event of a side impact collision; and
    a pair of couplers, each said coupler being configured for a respective opposing end of said first pad to the adjacent column, each said coupler comprising
        a brace, said brace being substantially rectangularly shaped, said brace being dimensioned to extend from proximate to a top to proximate to a bottom of said first pad adjacent to said respective opposing end of said first pad, said brace comprising metal,
        a plurality of holes positioned through said brace, said plurality of holes comprising holes positioned singly proximate to each opposing endpoint of said brace,
        a plurality of screws equivalently numbered to said plurality of holes, said screws being self-tapping, and
        wherein each said hole is positioned in said brace such that a respective said screw is positionable through said hole and said first pad proximate to a respective said opposing end, wherein said first pad is screwedly coupled to the adjacent column.

2. The assembly of claim 1, further including said first pad comprising rubber.

3. The assembly of claim 1, further including said first pad having a pair of opposing sections extending divergently from a center of said first pad defining a recess, said recess being substantially complementary to the seatbelt pulley and the portion of the adjacent column of the vehicle to which the seatbelt pulley is coupled.

4. The assembly of claim 3, further including said first pad being substantially half-octagonally shaped when viewed from a top of said first pad.

5. The assembly of claim 4, further including an insert coupled to said first pad within said recess, said insert being resilient, wherein said insert is positioned in said recess such that said insert is configured for positioning between said first pad and the seatbelt pulley.

6. The assembly of claim 5, further comprising:
    said insert extending between a pair of angled sections of said first pad; and
    said insert being positioned proximate to said top of said first pad.

7. The assembly of claim 5, further including said first pad and said insert comprising foam.

8. The assembly of claim 7, further including said first pad and said insert comprising rubber foam.

9. The assembly of claim 1, further including a second pad, said second pad being resilient, said second pad being configured for coupling to a window adjacent to the seatbelt pulley, wherein said second pad is configured to couple to the window adjacent to the seatbelt pulley such that said second pad is configured to provide impact protection to the head of the user in the event of a side impact collision.

10. The assembly of claim 9, further including said second pad being substantially rectangularly box shaped.

11. The assembly of claim 9, further including said second pad comprising foam.

12. The assembly of claim 11, further including said second pad comprising rubber foam.

13. The assembly of claim 9, further comprising:
    a first fastener coupled to a back face of said second pad;
    a second fastener adhesively couplable to the window, said second fastener being complementary to said first fastener; and
    wherein said second fastener is configured to adhesively couple to the window such that said second fastener is positioned to couple to said first fastener to couple said second pad to the window.

14. The assembly of claim 13, further including said first fastener and said second fastener comprising a nylon hook and loop fastener.

15. A personal protection assembly comprising:
a first pad, said first pad being resilient, said first pad being substantially complementary to a seatbelt pulley and a portion of an adjacent column of a vehicle to which the seatbelt pulley is coupled, said first pad being configured for coupling to the adjacent column to cover the seatbelt pulley, said first pad having a pair of opposing sections extending divergently from a center of said first pad defining a recess, said recess being substantially complementary to the seatbelt pulley and the portion of the adjacent column of the vehicle to which the seatbelt pulley is coupled, said first pad being substantially half-octagonally shaped when viewed from a top of said first pad, said first pad comprising rubber, said first pad comprising foam, said first pad comprising rubber foam;
an insert coupled to said first pad within said recess, said insert being resilient, wherein said insert is positioned in said recess such that said insert is configured for positioning between said first pad and the seatbelt pulley, said insert extending between a pair of angled sections of said first pad, said insert being positioned proximate to said top of said first pad, said insert comprising foam, said insert comprising rubber foam;
a pair of couplers, each said coupler being configured for a respective opposing end of said first pad to the adjacent column, each said coupler comprising:
a brace, said brace being substantially rectangularly shaped, said brace being dimensioned to extend from proximate to said top to proximate to a bottom of said first pad adjacent to said respective opposing end of said first pad, said brace comprising metal,
a plurality of holes positioned through said brace, said plurality of holes comprising holes positioned singly proximate to each opposing endpoint of said brace,
a plurality of screws equivalently numbered to said plurality of holes, said screws being self-tapping, each said hole is positioned in said brace, and
wherein a respective said screw is positionable through said hole and said first pad proximate to a respective said opposing end, wherein said first pad is screwedly coupled to the adjacent column;
a second pad, said second pad being resilient, said second pad being configured for coupling to a window adjacent to the seatbelt pulley, said second pad being substantially rectangularly box shaped, said second pad comprising rubber, said second pad comprising foam, said second pad comprising rubber foam;
a first fastener coupled to a back face of said second pad;
a second fastener adhesively couplable to the window, said second fastener being complementary to said first fastener, wherein said second fastener is configured to adhesively couple to the window such that said second fastener is positioned to couple to said first fastener to couple said second pad to the window;
said first fastener and said second fastener comprising a nylon hook and loop fastener; and
wherein said first pad is positioned for coupling to the adjacent column to cover the seatbelt pulley, wherein said first pad is configured to provide impact protection to a head of a user positioned in a seat fitted with a seatbelt coupled to the seatbelt pulley in the event of a side impact collision, wherein said second pad is configured to couple to the window adjacent to the seatbelt pulley such that said second pad is configured to provide impact protection to the head of the user in the event of a side impact collision.

\* \* \* \* \*